United States Patent
Parker et al.

(10) Patent No.: US 7,162,132 B2
(45) Date of Patent: Jan. 9, 2007

(54) OPTICAL WAVEGUIDE STRUCTURE

(75) Inventors: Greg Parker, Hampshire (GB); Martin Charlton, Hampshire (GB); Majd Zoorob, Hampshire (GB)

(73) Assignee: Mesophotonics Ltd., Southampton (GB)

( * ) Notice: Subject to any disclaimer, the term of this patent is extended or adjusted under 35 U.S.C. 154(b) by 24 days.

(21) Appl. No.: 10/619,556

(22) Filed: Jul. 16, 2003

(65) Prior Publication Data

US 2004/0067035 A1   Apr. 8, 2004

Related U.S. Application Data

(63) Continuation-in-part of application No. 10/196,727, filed on Jul. 17, 2002, now abandoned.

(51) Int. Cl.
 *G02B 6/10* (2006.01)
(52) U.S. Cl. .................................... 385/129; 385/131
(58) Field of Classification Search ........ 385/129–132, 385/123, 125–127, 141, 142, 144
See application file for complete search history.

(56) References Cited

U.S. PATENT DOCUMENTS

| | | | | |
|---|---|---|---|---|
| 5,526,449 | A * | 6/1996 | Meade et al. ................. | 385/14 |
| 6,075,915 | A * | 6/2000 | Koops et al. ............... | 385/125 |
| 6,134,369 | A * | 10/2000 | Kurosawa .................... | 385/132 |
| 6,542,682 | B1 * | 4/2003 | Cotteverte et al. .......... | 385/125 |
| 6,560,006 | B1 * | 5/2003 | Sigalas et al. ............... | 359/321 |
| 2001/0033409 | A1 * | 10/2001 | Takada ........................ | 359/241 |
| 2002/0150366 | A1 * | 10/2002 | Loncar et al. ............... | 385/125 |
| 2004/0062505 | A1 * | 4/2004 | Sugitatsu et al. ........... | 385/131 |
| 2004/0067035 | A1 * | 4/2004 | Parker et al. ................ | 385/129 |
| 2004/0086244 | A1 * | 5/2004 | Zoorob et al. .............. | 385/123 |

FOREIGN PATENT DOCUMENTS

| | | |
|---|---|---|
| EP | 1 168 008 | 1/2002 |
| WO | WO 01/77726 | 10/2001 |
| WO | WO 02/25781 | 3/2002 |

OTHER PUBLICATIONS

G. Meltz et al, "Bragg Grating Formation and Germanosilicate Fiber Photosensitivity" *International Workshop on Photoinduced Self-Organization effects in Optical fiber*, May 1991, pp. 185-199.

S.V. Gaponenko et al, "Spontaneous Emission of Dye Molecules, Semiconductor Nanocrystals, and Rare-Earth Ions in Opal-Based Photonic Crystals" *Journal of Lightwave Technology*, vol. 17, No. 11, Nov. 1999, pp. 2128-2137.

(Continued)

*Primary Examiner*—Sung Pak
(74) *Attorney, Agent, or Firm*—Nixon & Vanderhye P.C.

(57) ABSTRACT

A waveguide structure according to the invention comprises a core layer (10), having a refractive index $n_{core}$, and an array of rods (11) in the core layer having a refractive index $n_{rods}$. The refractive indices satisfy the inequality: $n_{rods} > n_{core}$. In a planar waveguide structure buffer (12) and cladding (13) layers are included, having a refractive index $n_{buffer}$ and $n_{cladding}$ respectively. The refractive indices then satisfy the inequality: $n_{rods} > n_{core} > n_{cladding}$ and $n_{buffer}$. This condition provides greater vertical confinement of the E-field of an optical signal passing through the waveguide. Furthermore, it allows waveguides to be formed of a glassy material having a similar refractive index and core dimensions to that of a fiber. A high refractive index contrast within the photonic crystal region is used while totally eliminating the need for mode conversion to launch light in and out of the waveguide.

33 Claims, 6 Drawing Sheets

OTHER PUBLICATIONS

H. Benisty et al, "Radiation Losses of Waveguide-Based Two-Dimensional Photonic Crystals: Positive Role of the Substrate" *Applied Physics Letters*, vol. 76, No. 5, Jan. 2000, pp. 532-534.

H.W.P. Koops et al, "Two-Dimensional Photonic Crystals Produced by Additive Nanolithography with Electron Beam-Induced Deposition Act as Filters in the Infrared" *Microelectronic Engineering*, vol. 57-58, 2001, pp. 995-1001.

Koops, "Photonic Crystals Built by Three-Dimensional Additive Lithography Enable Integrated Optics of High Density" *Proceedings of the SPIE*, vol. 2849, Aug. 1996, pp. 248-256.

M.D.B. Charlton et al, "Visible Wavelength Photonic Crystal Devices: Experimental Investigations of Up-Scattering and Line defect Waveguide Bends" *IEE Colloquium, Microengineering in Optics and Optoelectronics*, Nov. 1999, pp. 7/1-6.

\* cited by examiner

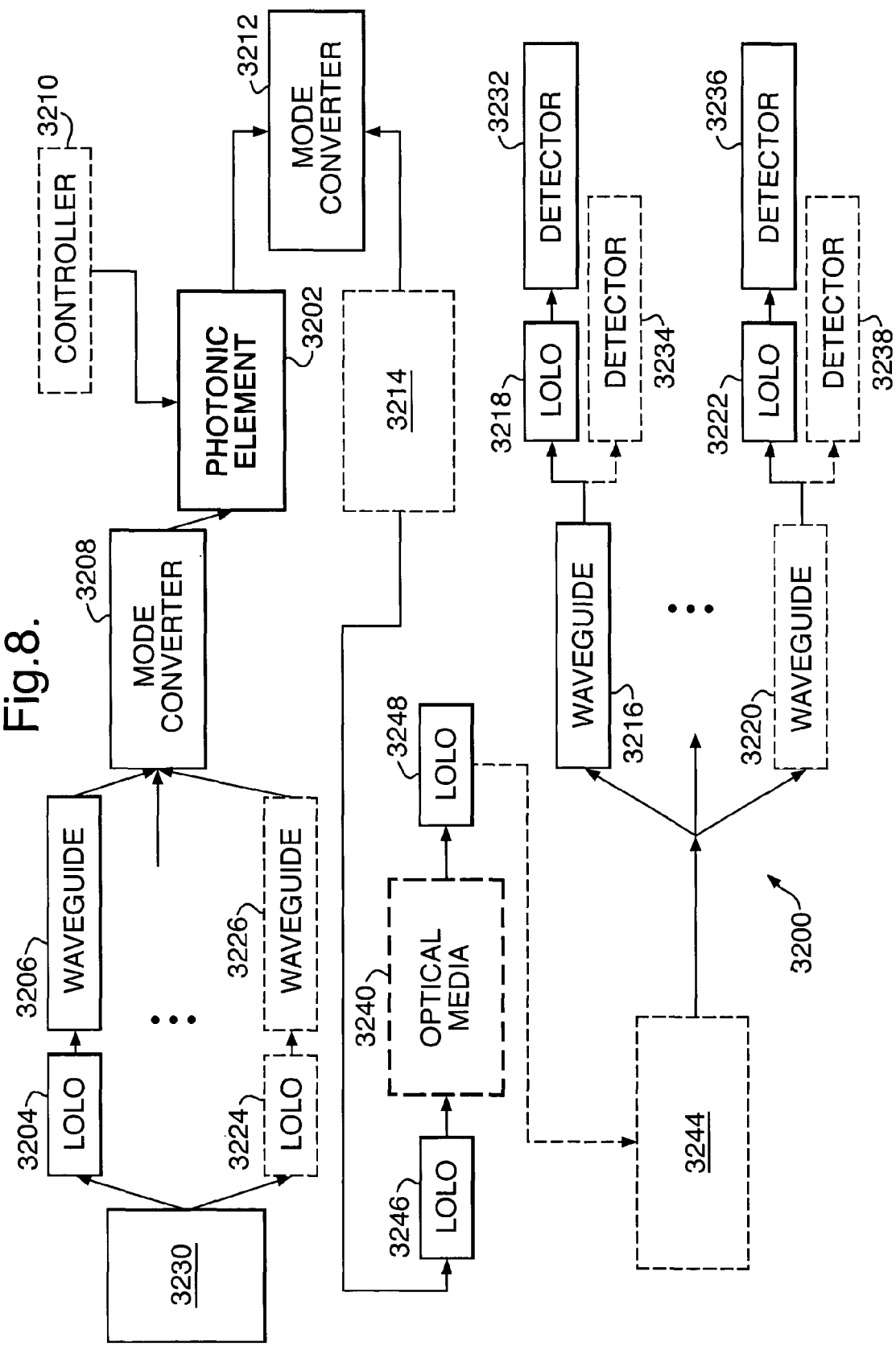

OPTICAL WAVEGUIDE STRUCTURE

This application is a continuation-in-part of application Ser. No. 10/196,727, filed Jul. 17, 2002 now abandoned.

FIELD OF THE INVENTION

The present invention relates to the field of optical devices and in particular but not exclusively to waveguide structures in integrated optical circuits.

BACKGROUND TO THE INVENTION

It is increasingly recognised that integrated optical circuits have a number of advantages over electrical circuits. However, it has been difficult to produce integrated optical circuits which are comparably small, primarily due to the difficulty in producing waveguides which can include tight bends without large signal losses. It has also been difficult to produce integrated optical circuits including signal processing devices which can be easily coupled to current optical fibres, owing to a difference in the refractive index of the material used for optical fibres and those materials typically used for integrated optical devices, whilst still maintaining compact sizes.

Photonic crystals typically comprise a lattice of air holes formed in a core material, typically silicon, and exhibit a photonic bandgap. By not including some holes in the lattice, a defect state waveguide can be formed. Confinement of light within the waveguide is provided by using light within the photonic bandgap wavelength range. However, it has been found that devices of this type suffer from large losses, mainly due to the escape of light from the waveguide in a vertical direction. Furthermore, in order to provide a strong and complete bandgap at optical frequencies, it has been necessary to use a high refractive index material, typically silicon. This makes it difficult to couple light into the waveguides from existing optical fibres, which typically have a core having a much lower refractive index. This problem necessitates complicated, lossy mode coupling devices.

The object of the present invention is to reduce losses from photonic crystals and to allow easy coupling of photonic crystal structures to existing waveguides.

SUMMARY OF THE INVENTION

According to a first aspect of the present invention, an optical waveguide structure comprises a core layer having a first refractive index $n_{core}$, and an array of sub-regions within the core layer having a second refractive index $n_{rods}$, the array extending longitudinally along the waveguide and giving rise to a photonic band structure within the core layer, wherein:

$$n_{rods} - n_{core} > 0.1.$$

As is well known in the field of photonic crystals, in order to give rise to an appreciable band structure an absolute refractive index contrast of greater than 0.1 must be present between the main body of material and the sub-regions, which are typically holes. Indeed, typically, high refractive index such as silicon (n=4) have been used with a lattice of air holes (n=1) to provide a complete photonic bandgap. Accordingly, written grating structures, such as Bragg gratings, which have a refractive index contrast of less than 0.1 cannot be considered to be photonic crystals. Written grating structures do not interact with light in the same way as photonic crystals and so cannot be used to achieve the same functionality. Written structures only interact with the evanescent field of optical signals which gives rise to much weaker interaction.

Preferably, the waveguide structure is a planar waveguide structure, the core layer being formed between a cladding layer and a buffer layer, the cladding layer having a third refractive index $n_{cladding}$, and the buffer layer having a fourth refractive index $n_{buffer}$, wherein:

$$n_{rods} > n_{core} > n_{cladding} \text{ and } n_{buffer}.$$

Alternatively, the waveguide structure may be an optical fibre, comprising a cladding layer having a third refractive index $n_{cladding}$, surrounding the core layer, wherein:

$$n_{rods} > n_{core} > n_{cladding}.$$

The cladding layer of the optical fibre is preferably planarised in the vicinity of the array of sub-regions, the array of sub-regions extending through the planarised cladding layer and into the core layer.

Preferably, the array of sub-regions gives rise to a photonic bandgap.

Preferably, the core layer has a refractive index between 1.4 and 2.5. Preferably, the sub-regions have a refractive index between 1.8 and 4. Preferably, the cladding and buffer layers have a refractive index between 1.3 and 1.6.

The use of an array of sub-regions within a waveguide structure having a refractive index higher than the core layer provides a number of benefits over the prior art. Owing to the high index of the sub-regions the out-of-plane divergence of light in the sub-regions is reduced as compared with the air holes which are typically used in photonic crystal structures. As a result, more light is coupled back into the core material at the rod/core interface. Additionally, as the refractive index of the sub-regions is higher than that of the buffer layer and cladding layers, coupling of light into the buffer and cladding layers is reduced. Thus, the present invention provides greater vertical confinement of light within the waveguide. This fact, coupled with the existence of a photonic bandgap at optical wavelengths, allows tight waveguide bends to be formed with low loss at optical wavelengths. According to the present invention, the core can be made of a material with a refractive index better matched to that of conventional optical fibre, e.g. doped silica or silicon oxynitride. This means that the waveguide can be easily coupled to conventional optical fibres without the need for any additional, complicated coupling structures.

The nature of the band structure, which arises from using high index sub-regions, is such that the dimensions required for the lattice pitch to produce a bandgap at the wavelength typically used for telecommunications can be much larger than in conventional photonic crystals. As a result, fabrication tolerances are greatly reduced, as the sub-regions can be spaced further apart and each sub-region can be larger. This means that the waveguide of the present invention can be easily fabricated using conventional lithography. Typically, prior photonic crystal fabrication techniques require much higher precision lithography, such as e-beam lithography.

Furthermore, in order to produce a strong extinction ratio bandgap, fewer sub-regions are required than in conventional photonic crystals. This is partly due to the properties of a structure composed of high refractive index rods in a low refractive index background and partly due to the dielectric contrast remaining large for different wavelengths.

In a conventional photonic crystal, the high refractive index material is the core. Different wavelengths coupled into the core experience different effective refractive indices.

As wavelength increases effective refractive index decreases, which in turn reduces the effective dielectric contrast. This adversely affects the bandgap extinction ratio and gap to midgap ratio. In the present invention, the high refractive index rods maintain their index irrespective of wavelength and hence the dielectric contrast is maintained at the ratio of the core index to the rod index.

Preferably, the sub-regions are formed from silicon. Preferably, the core layer is formed from silicon nitride, silicon oxynitride, doped silica, tantalum pentoxide or doped tantalum pentoxide. The cladding layer and buffer layer are preferably formed from silicon dioxide.

The sub-regions may extend through the cladding layer as well as the core layer and partially or fully into the buffer layer. Alternatively, the cladding layer may include sub-regions corresponding to the sub-regions in the core layer having a refractive index which is greater than or equal to the refractive index of the cladding layer but which is less than or equal to the refractive index of the core.

The present invention is applicable to waveguides connecting devices in integrated optical circuits as well as to individual optical devices which are used in integrated optical circuits. Any device incorporating waveguide bends in a glassy core layer can be improved or at least significantly reduced in size, by use of the present invention. Such devices include Arrayed Waveguide Gratings (AWGs), Mach Zehnder interferometers, directional couplers, dispersion compensators, splitters/multiplexers, polarisation compensators, optical switches and optical delay elements. The fact that tight waveguide bends can be formed using the present invention, without significant loss can reduce the size of these components by several orders of magnitude.

Preferably, the sub-regions are arranged in a square lattice. The square lattice is useful in that it gives rise to a sequence of different bandgaps. This means that a square lattice having a relatively large pitch spacing can be used, with large individual sub-regions, and it is still possible to get a higher order bandgap in the visible region or telecommunications region of the spectrum.

Preferably, the core layer includes a waveguiding region having no sub-regions. Preferably, the waveguiding region includes a bend.

According to a second aspect of the invention, a method of manufacturing a optical waveguide structure comprises the steps of:

providing a core layer having a first refractive index $n_{core}$;

forming an array of holes in the core layer extending longitundinally along the waveguide structure;

filling the holes with a material having a second refractive index $n_{rods}$, wherein:

$n_{rods} - n_{core} > 0.1$.

Preferably, the optical waveguide is a planar waveguide, the method further including the steps of:

providing a buffer layer having a refractive index $n_{buffer}$ on one side of the core layer; and providing a cladding layer having a refractive index $n_{cladding}$, on the other side of the core layer, wherein:

$n_{rods} > n_{core} > n_{cladding}$ and $n_{buffer}$.

Alternatively, the optical waveguide may be an optical fibre, the method further including the steps of:

providing a cladding layer having a refractive index $n_{cladding}$, surrounding the core layer, wherein:

$n_{rods} > n_{core} > n_{cladding}$.

According to a third aspect of the present invention, a method of guiding an optical signal comprises the step of passing an optical signal through a waveguiding region of an optical waveguide structure comprising a core layer having a first refractive index $n_{core}$, and an array of sub-regions within the core layer extending longitudinally along the waveguide having a second refractive index $n_{rods}$, the array of sub-regions giving rise to a photonic band structure within the core layer, wherein:

$n_{rods} - n_{core} > 0.1$.

Preferably, the waveguide is a planar waveguide, wherein the core layer is formed between a cladding layer and a buffer layer, the cladding layer having a third refractive index $n_{cladding}$, and the buffer layer having a fourth refractive index $n_{buffer}$, and wherein:

$n_{rods} > n_{core} > n_{cladding}$ and $n_{buffer}$.

Alternatively, the optical waveguide may be an optical fibre, wherein a cladding layer has a third refractive index $n_{cladding}$, and surrounds the core layer, and wherein:

$n_{rods} > n_{core} > n_{cladding}$.

According to a fourth aspect of the present invention, an optical waveguide structure comprises a core layer having a first refractive index $n_{core}$, and a 2-dimensional array of sub-regions within the core layer having a second refractive index $n_{rods}$, the array of sub-regions extending longitudinally along the waveguide and giving rise to a photonic band structure within the core layer, wherein:

$n_{rods} > n_{core}$.

The preferred features of the first aspect are all equally applicable to the fourth aspect of the present invention. Furthermore, preferably $n_{rods} - n_{core} > 0.1$.

According to a fifth aspect of the present invention, a method of manufacturing a optical waveguide structure comprises the steps of:

providing a core layer having a first refractive index $n_{core}$;

forming a 2-dimensional array of holes in the core layer extending longitundinally along the waveguide structure;

filling the holes with a material having a second refractive index $n_{rods}$, wherein:

$n_{rods} > n_{core}$.

The preferred features of the second aspect are all equally applicable to the fifth aspect of the present invention. Furthermore, preferably $n_{rods} - n_{core} > 0.1$.

According to a sixth aspect of the present invention, a method of guiding an optical signal comprises the step of passing an optical signal through a waveguiding region of an optical waveguide structure comprising a core layer having a first refractive index $n_{core}$, and a 2-dimensional array of sub-regions within the core layer extending longitudinally along the waveguide having a second refractive index $n_{rods}$, the array of sub-regions giving rise to a photonic band structure within the core layer, wherein:

$n_{rods} > n_{core}$.

The preferred features of the third aspect are all equally applicable to the sixth aspect of the present invention. Furthermore, preferably $n_{rods} - n_{core} > 0.1$.

BRIEF DESCRIPTION OF THE DRAWINGS

Examples of the present invention will now be described in detail with reference to the accompanying drawings, in which.

DETAILED DESCRIPTION

Photonic crystal waveguide structures are based on some perturbation in dielectric constant in the core of a planar waveguide structure. This has most commonly been performed by the etching of air rods into the core layer of the waveguide. As light propagates through the core it interacts with the dielectric constant modulation and, in some structures, in a manner analogous to electrons in a semiconductor, certain electromagnetic fields are forbidden to propagate in the core. The forbidden electromagnetic fields form a photonic bandgap. More detail on the nature of the band structure of photonic crystals of this sort can be found in WO98/53351.

Figure 1:
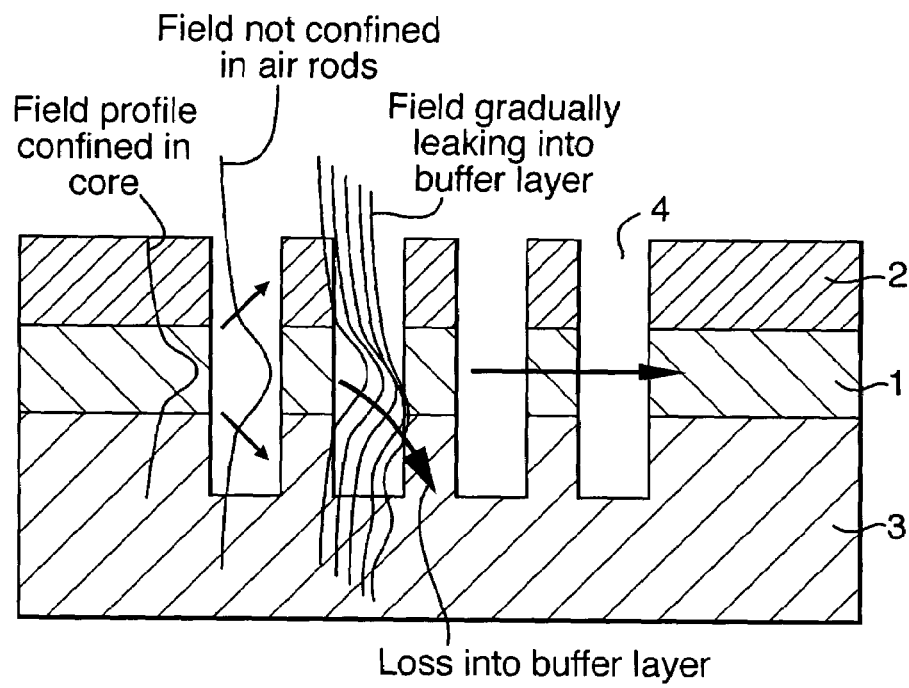
FIG. 1 is a schematic cross sectional view of a photonic crystal embedded in a waveguide structure in accordance with the prior art.

FIG. 1 illustrates the interaction of the E-field with the core 1 in a photonic crystal according to the prior art. The light is travelling through the core 1 from left to right. A profile of the E-field within the core 1, cladding 2 and buffer 3 layers is shown. It can be seen that in the photonic crystal region the mode confinement is reduced and there is out of plane loss. When the light reaches the first air/core interface, the light diverges strongly in the vertical direction, introducing loss. Once the light is in the air region 4 there is no confinement and light escapes from the top of the structure and into the buffer layer 3, which is of a higher refractive index than air. Furthermore, owing to the fact that the structure is not symmetric, and light is not well confined in the vertical direction, light leaks into the buffer layer 3 from the air rods 4.

Vertical loss in the waveguide structure is very significant and limits the usefulness of the structure in practical devices, especially in confinement applications such as in waveguide bends.

Figure 2:
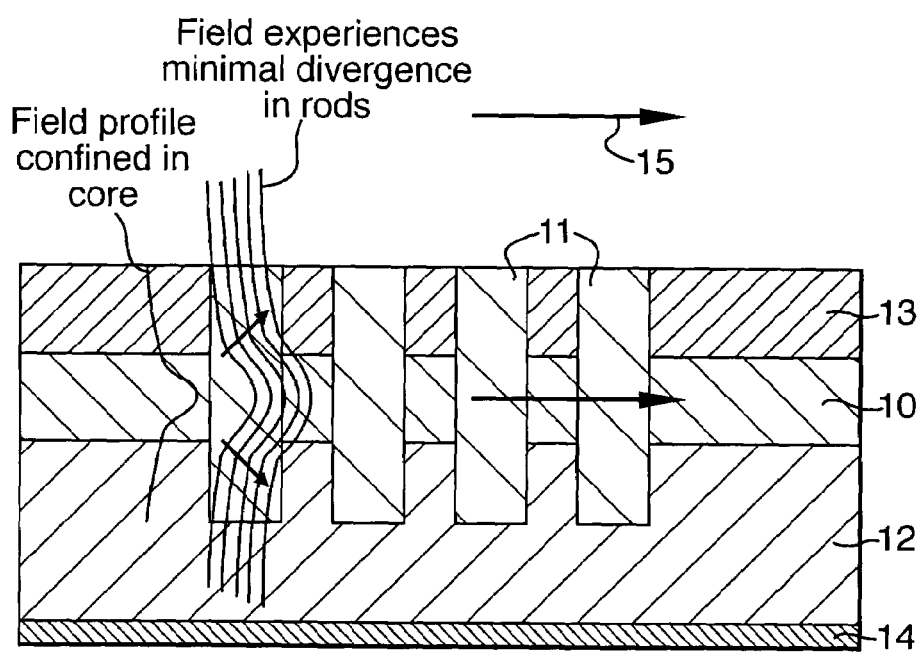
FIG. 2 is a schematic cross sectional view of a photonic crystal embedded in a waveguide structure in accordance with the present invention.

FIG. 2 shows a waveguide structure according to one aspect of the present invention and shows the interaction of between the E-field in the core 10 and in the photonic crystal section. The waveguide structure shown in FIG. 2 comprises a core layer 10, having a refractive index $n_{core}$, an array of rods 11 in the core layer 10 having a refractive index $n_{rods}$, and buffer 12 and cladding layers 13 having a refractive index $n_{buffer}$ and $n_{cladding}$, respectively. In this example the rods 11 extend through the cladding layer 13 and into the buffer layer 12. The refractive indices satisfy the inequalities:

$$n_{rods} - n_{core} > 0.1 \text{ and } n_{rods} > n_{core} > n_{cladding} \text{ and } n_{buffer}.$$

This condition provides greater vertical confinement of the E-field of an optical signal passing through the waveguide. As shown in FIG. 2, the profile of the E-field experiences minimal divergence in the rods 11. The higher refractive index of the rods 11 eliminates the tendency of the light to leak into the buffer layer 12 and reduces losses from the top of the structure and into the substrate. The arrow 15 indicates the longitudinal direction of the waveguide from which it can be seen that the array extends longitudinally along the waveguide.

The core 10 material of the structure of FIG. 2 is a few microns in thickness ans is formed of silicon nitride (n=2.02). Alternatively, it could be a low index material such as germanium doped silica, which allows simple coupling of the waveguide to standard optical fibres, or silicon oxynitride, tanatalum pentoxide, doped tantalum pentoxide or doped silicon dioxide. The rods 11 are composed of silicon (n=3.46), giving a high index contrast, which is required to give a strong extinction ratio bandgap using simple lattice patterns. The cladding 13 and buffer 12 layers are formed of silicon dioxide. The buffer 12 and cladding 13 layers need not be formed of the same material as long as they satisfy the inequality above. The materials described above are examples only and it will be appreciated that other materials may be used. The benefit of the invention will be realised as long as the inequalities are satisfied. However, for structures which are easily coupled to typical optical fibres and devices it is preferred that the core layer has a refractive index between 1.4 and 2.5, the rods have a refractive index between 1.8 and 4 and the cladding and buffer layers each have a refractive index between 1.3 and 1.6.

The waveguide of FIG. 2 also includes a substrate layer 14 underneath the buffer layer 12. The waveguide structure of FIG. 2 can be fabricated as follows. The buffer layer 12 is put on the substrate by thermal oxidation, HIPOX or plasma enhanced chemical vapour deposition (PECVD) depending on whether a thin or thick oxide is being deposited. The core layer is put down next by PECVD, CVD or sputtering. The cladding layer is then deposited by PECVD, CVD or sputtering. The position of the rods 11 is then defined by etching into the core 10. Wet or dry etching may be used but dry etching is preferred. The position of the rods is either direct-written using an e-beam, or transferred from a mask. The high index material, in this case silicon, is then deposited into the etched holes using PECVD, chemical vapour deposition (CVD), molecular beam epitaxy (MBE) or sputtering. Any silicon on top of the waveguide can be removed preferably by dry etching, but alternatively by controlled wet etching or chemical mechanical polishing. Alternatively, silicon rods can be grown or etched from the substrate and a waveguide structure grown around the rods.

The etching process used to define the rods can be performed using conventional lithography. Prior photonic crystal waveguide structures have required the use of E-beam lithography, however, the material system of the present invention gives rise to a useful band structure at larger lattice spacings than in conventional photonic crystal structures and so allows the rods to be larger and more widely spaced than the air rods of the prior art. Furthermore, the present invention allows for greater manufacturing tolerances.

Figure 3:
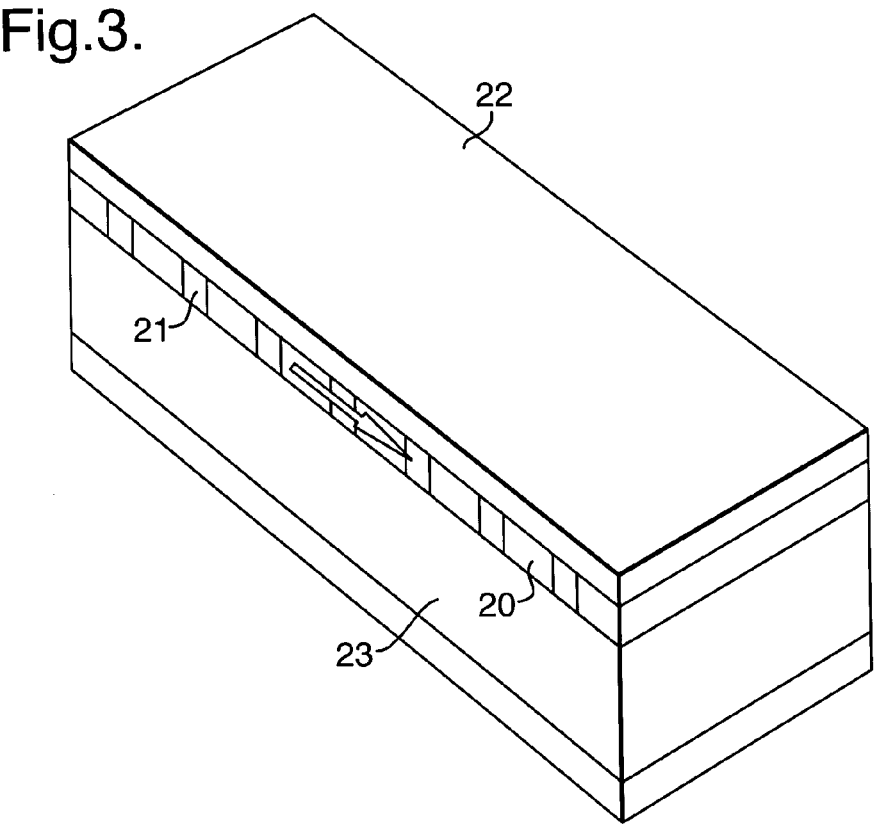
FIG. 3 shows a waveguide design in accordance with the present invention.

Additionally, it is possible to include a different material to define the rods in the buffer and cladding layers, with a refractive index $n_{rods\ in\ cladding\ and\ buffer}$. In this instance the following inequality applies:

$$n_{rods\ in\ core} > n_{core} \geq n_{rods\ in\ cladding\ and\ buffer} \geq n_{cladding}$$
and $n_{buffer}$ This type of structure does not confine light so well as complete rods of a high index material but there are advantages in fabrication. The buffer 23 and core 20 layer are initially grown. Rods 21 are then defined and etched through the core layer 20. Silicon is deposited into the rods 21 and on top of the core prior to deposition of the cladding. The silicon remaining on top of the core is removed by wet or dry etching or chemical mechanical polishing. Following this the cladding layer 22 is deposited using PECVD, CVD or sputtering to form the structure shown in FIG. 3.

The use of high index rods in low index core materials provides a revolutionary method for the formation of a fibre compatible photonic crystal technology. The waveguide core can be formed of a glassy material having similar core dimensions to that of a fibre. A high refractive index contrast within the photonic crystal region is used while the use of a core layer having a refractive index close to that of the core of conventional optical fibre eliminates the need for mode conversion to launch light in and out of the waveguide. Additionally, as described above, the out-of-plane loss is also reduced as compared with conventional high index waveguides.

Figure 4:
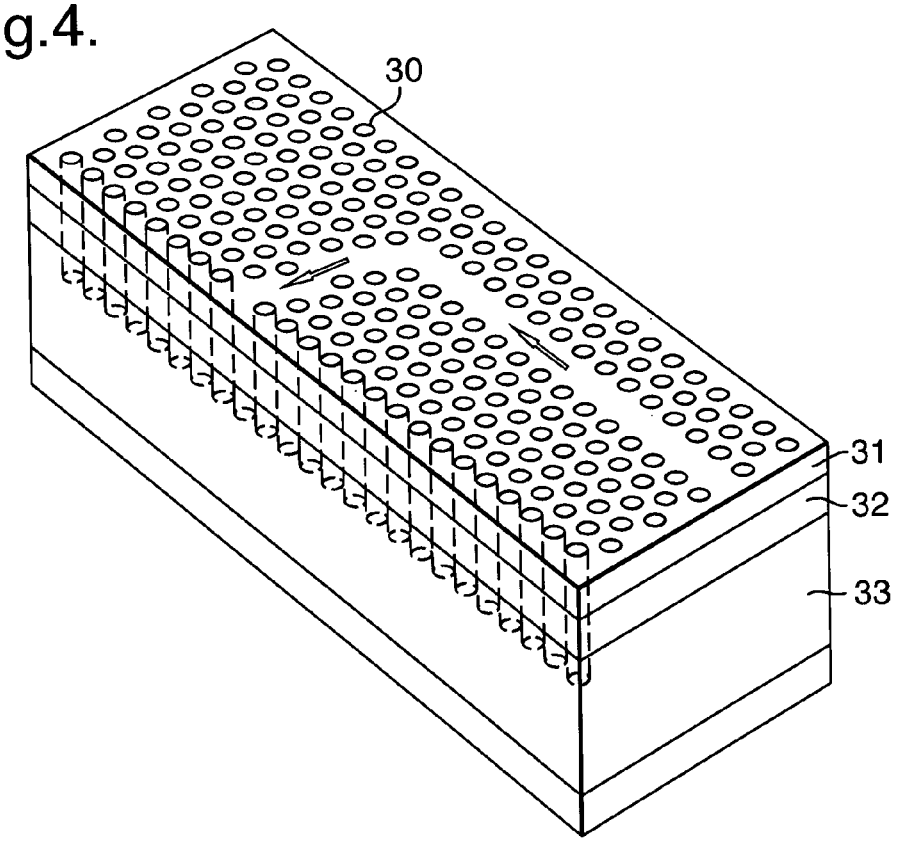
FIG. 4 shows a waveguide bend formed with a waveguide design in accordance with the present invention.

As shown in FIG. 4, waveguides in accordance with the present invention can include tight waveguide bends. The waveguide structure comprises an array of silicon rods 30 extending through a cladding layer 31 and a core layer 32 into a buffer layer 33. A number of rods are missing from the array forming a waveguide which includes a 90° bend. Clearly, the waveguide could take any shape and could, for example, include a bifurcation to form a splitter. The minimal vertical loss from the waveguide means that light within the bandgap of the photonic crystal region is confined with the waveguide and is forced to propagate around the bend. This allows integrated optical circuits to be fabricated over a much smaller area and optical devices incorporating waveguide bends to be made smaller. For example, waveguide bends residing in an arrayed waveguide grating (AWG) are generally of the order of a couple of millimeters. These can be reduced using the present invention to be of the order of a couple of microns, with minimal loss of light.

The silicon rods of FIG. 4 are arranged in a square lattice, which gives rise to a series of higher order bandgaps above the base bandgap. These higher order bandgaps allow larger rod size and spacing to be used whilst still giving rise to a band structure which is useful at optical and telecommunications wavelengths. Furthermore, the structure can be designed so that the TE and TM modes of the band structure overlap at higher order bandgaps, providing the possibility of using even larger geometries.

The present invention allows a low refractive index core to be used. In fact, the lower the refractive index of the core the higher the refractive index contrast is. This means that the waveguide can be matched to incoming and outgoing optical fibre and input/output coupling losses minimised.

Figure 5:
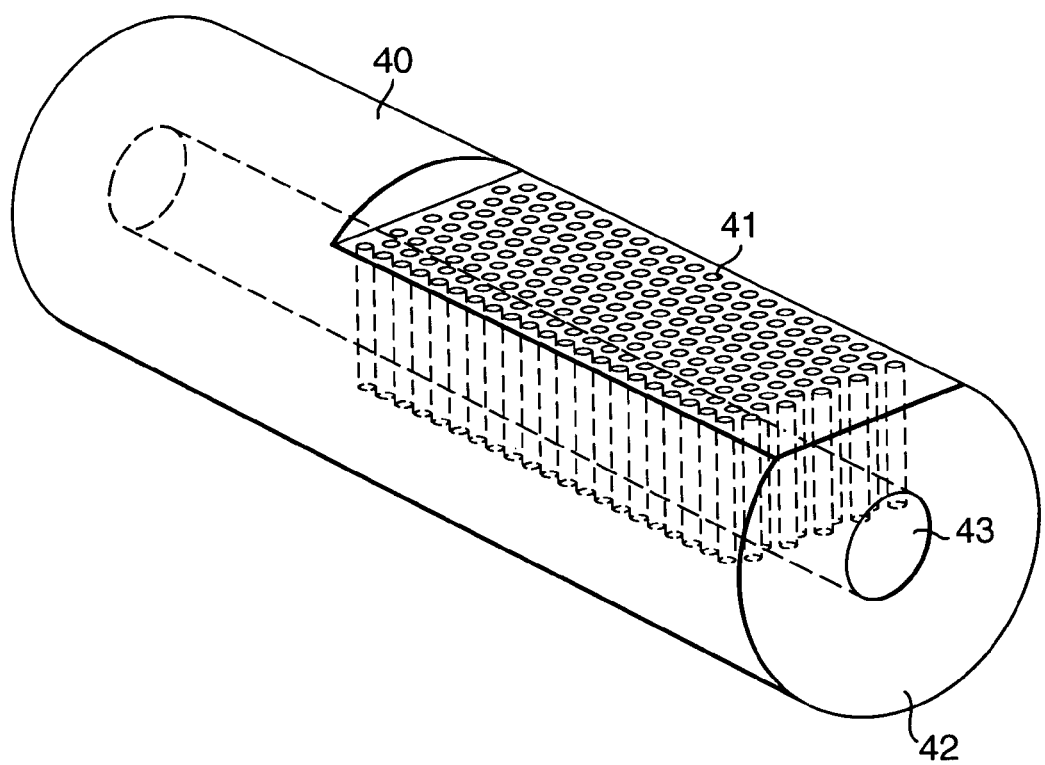
FIG. 5 shows an optical fibre incorporating a structure in accordance with present invention

The present invention can be applied to any glass technology, whether it is planar or fibre. For example, as shown in FIG. 5, conventional fibre 40 could be flattened or planarised and an array of filled holes 41 incorporated into the flattened region through the cladding 42 and the core 43. The structure as a whole remains in-fibre.

The material forming the high index rods is not necessarily silicon, it may for example be a non-linear material of high refractive index, providing the possibility of a tuneable device, for example a tuneable filter.

The present invention provides a waveguiding structure having a photonic band structure with lower loss than prior structures of the same type. This means that a larger number of rows of rods, equating to conventional holes, can be used in a device structure for the same amount of loss. High losses in prior structures has limited the effect of the band structure. With the present invention it is feasible to produce longer structures for the same loss, and hence longer time delays and higher resolution filters and demultiplexers.

Waveguiding structures according to the present invention may be used in photonic elements in many different applications. Photonic elements, including those of the present invention, may be implemented in telecommunications systems, in biosensor devices, and in optical storage media.

Figure 6:
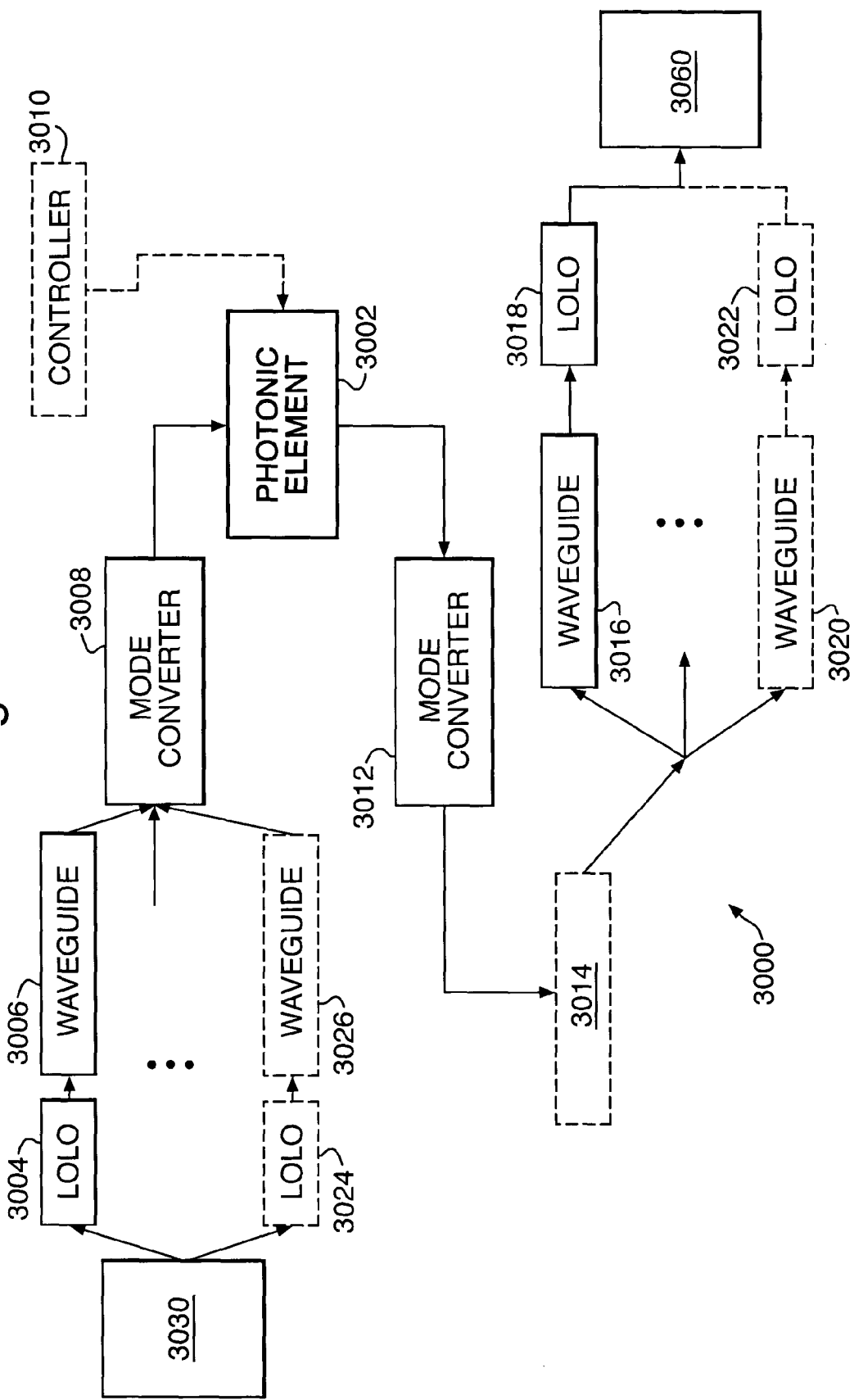
FIG. 6 shows schematically a photonic device incorporating a photonic element suitable for use in a telecommunications system.

FIG. 6 illustrates the general arrangement of a photonic device 3000 incorporating a photonic element 3002. The illustrated photonic device 3000 is suitable for use in a telecommunications system. A light signal typically propagates along a waveguiding structure 3050, such as an optical fibre. The photonic device 3000 includes: at least one Light On Light Off (LOLO) device 3004, 3024; at least one waveguide element 3006, 3026; a mode converter 3008; the photonic element 3002; a further mode converter 3012; at least one further waveguide element 3016,3020; and at least one further LOLO device 3018, 3022.

The LOLO device 3004 couples the waveguiding structure 3050 to other components of the photonic device 3000, in the process converting the mode of the telecommunications waveguiding structure 3050 (which is typically large, approximately 8 mm in diameter) into a much smaller (approx. 1 to 2 mm in diameter) planar waveguide mode that can propagate along the photonic device 3002 with minimal loss. In many cases, several channels need simultaneous processing and multiple fibre inputs are provided.

Following the coupling of light from the external waveguiding structure 3050 to the photonic device 3002, horizontal confinement of the mode is commonly provided by at least one waveguide element 3006. Waveguide elements 3006 such as rib or ridge waveguides are often implemented in high refractive index contrast planar material systems. Other waveguide elements 3006 include waveguide splitters and bends. By means of these waveguide elements 3006 (defect state waveguides, ribs, ridges, splitters and/or bends), light from the LOLO device 3004 is transported from one region of the device to another.

The mode converter 3008 is required to provide efficient coupling of light from the waveguide into the photonic element 3002. Examples of wave converters include tapers, multi-mode interference slab couplers, and star couplers. Efficient coupling requires attention to appropriate propagation modes and angles in the photonic element 3002, in order to minimise reflections and loss from the interface of the element 3002. Following the conversion of the mode, the light is processed by, and propagates through, the photonic element 3002.

The operation of photonic element 3002 may be altered in a number of ways, including the application of an optical and/or an electrical control signal. The means for altering the operation of the photonic element 3002 is represented in the Figure as an (optional) controller element 3010. Examples of suitable controller elements 3010 include optical control signal sources, electrical control signal sources, and optical pumps, depending on the functionality of the photonic element.

The mode is converted back again into a mode for propagation along the waveguide by the further mode converter 3012. Optionally, additional photonic elements 3014 can be inserted to provide extra functionality and to increase the integration capabilities of the photonic device. The additional photonic elements 3014, when provided, may be associated with a corresponding variety of connecting optical components, including further waveguide devices and/or splitters. As the reader will appreciate, the connecting optical components may themselves be formed as integrated photonic elements as well as conventional waveguides joining the photonic elements. The optional, additional photonic element feature in the Figure represents the presence of at least one photonic element and the concomitant connecting optical components in order to provide a highly integrated optical device.

Finally, at least one further waveguide element 3016 (ribs, ridges, splitters and/or bends) is used to guide the light along to the further LOLO device 3018. In this arrangement, the light is coupled back out into an output waveguiding structure 3060. Multiple waveguide elements 3016,3020 and LOLO devices 3018,3022 can be used for applications such as demultiplexers.

It is further noted that the further waveguide elements 3016,3020 and further LOLO devices 3018,3022 may be one and the same as the LOLO devices 3004,3024 and waveguide elements 3006,3026.

Figure 7:
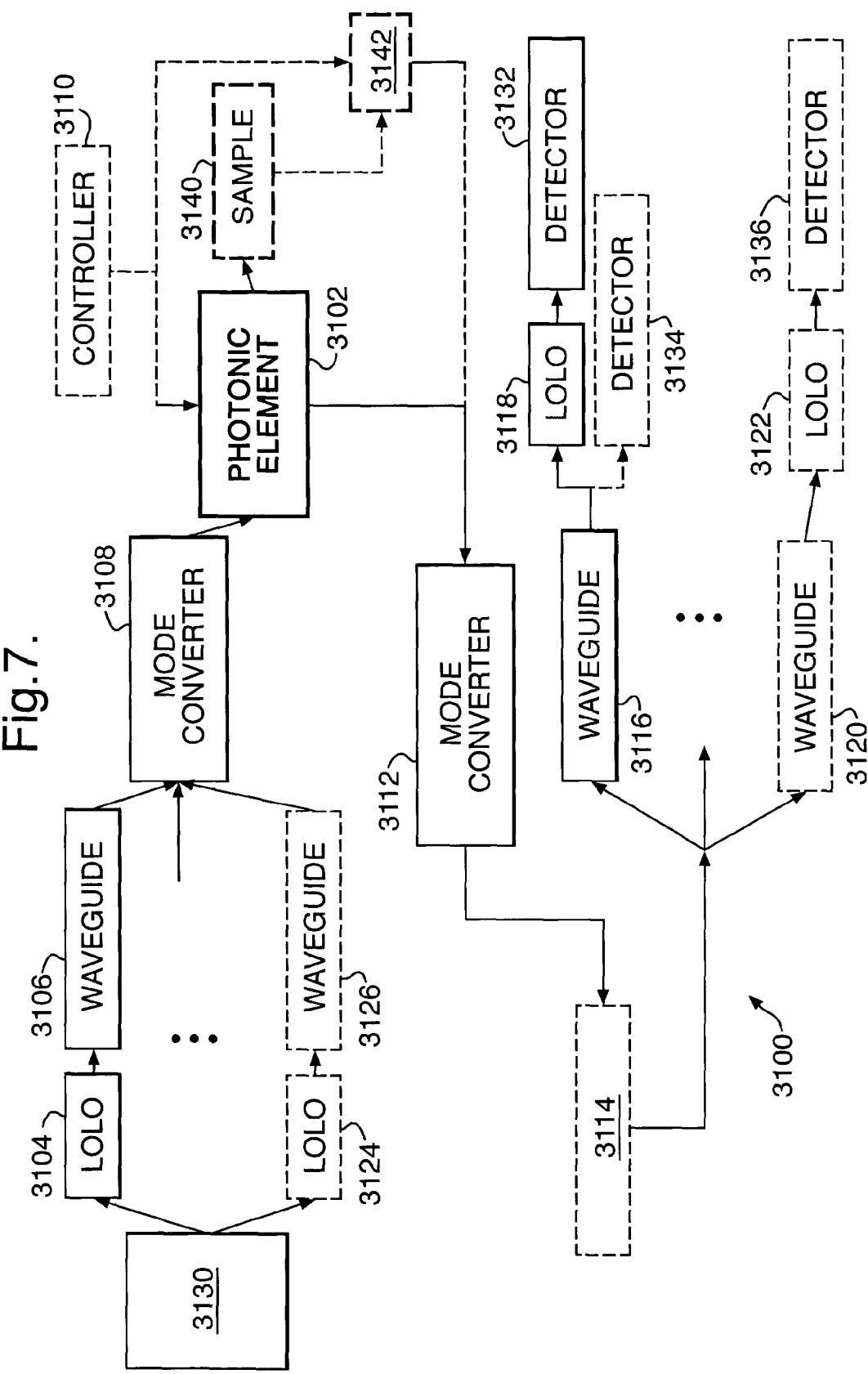
FIG. 7 shows schematically another photonic device incorporating a photonic element suitable for use in a biosensor arrangement; and, FIG. 8 shows schematically a further photonic device incorporating a photonic element suitable for use in an optical pick-up unit.

FIG. 7 illustrates the general arrangement of another photonic device 3100 incorporating a photonic element 3102. The illustrated photonic device 3100 is suitable for use in a biosensor arrangement.

The photonic device 3100 includes: at least one Light On Light Off (LOLO) device 3104, 3124; at least one waveguide element 3106, 3126; a mode converter 3108; the photonic element 3102; a further mode converter 3112; at least one further waveguide element 3116,3120; and at least one detector 3136,3134,3132.

Light from a light source 3130, for example a laser or a light emitting device (LED), is launched into the or each waveguide element 3106 via a corresponding LOLO device 3104. The launching of light could simply be end-facet coupling of the light into the waveguide 3106. Again, the waveguide element 3106, may include bends, splitters, ribs and/or ridge structured waveguides. The or each waveguide element 3106 is used to guide incoming light into different regions of the photonic device 3100 where illumination of different samples is performed.

The mode converter 3108 is required to provide efficient coupling of light from the waveguide into the photonic element 3102.

Preferably, the or each photonic element 3102 is itself provided with sample recesses for receiving at least one sample and illumination is performed inside the photonic element 3102. Alternatively, the photonic element 3102 is arranged to launch the light into at least one external biological sample 3140. In some examples of biosensor arrangements, the sample is assayed not as a result of direct illumination but rather through the observed interaction of the evanescent field of light propagating in the photonic element 3102.

Illumination of biological and/or biochemical samples can result in characteristic luminescence properties, for example fluorescence or phosphorescence. In the preferred arrangement, light emitted from the or each sample is then collected at another portion of the photonic element 3102: whereas, in the external sample arrangement, light emitted from the or each sample is collected at another photonic element 3142.

The operation of photonic element 3102, and where present the other photonic element 3142, may be altered in a number of ways, including the application of an optical and/or an electrical control signal. The means for altering the operation of the photonic element 3102,3142 is represented in the Figure as an (optional) controller element 3110. Examples of suitable controller elements 3110 include optical control signal sources, electrical control signal sources, and optical pumps.

Following the collection of the light, the mode is converted into a mode for propagation along the waveguide by the further mode converter 3112. Filtering and possible wavelength separation can then be performed using additional integrated photonic elements 3114.

The processed light signal is then routed around at least one further waveguide element 3116 (ribs, ridges, splitters and/or bends) is used to guide the light along to at least one integrated detector 3134. Processed light may alternatively be routed externally, a further LOLO device 3118,3122 providing the interface with an external detector 3132,3136. Many applications require the use of multiple detectors in order to span a range of different wavelengths, for example Raman Spectroscopy, or in order to distinguish between different samples.

FIG. 8 also illustrates the general arrangement of a photonic device 3200 incorporating a photonic element 3202. The illustrated photonic device 3200 is suitable for use in an optical pick-up unit, such as an optical disc reading head.

The photonic device 3200 includes: at least one Light On Light Off (LOLO) device 3204, 3224; at least one waveguide element 3206, 3226; a mode converter 3208; the photonic element 3202; a further mode converter 3212; at least one further waveguide element 3216,3220; and at least one integrated detector 3234,3238.

Light from a light source 3230, for instance a modulated laser or LED source, is launched into the photonic device 3200 by the LOLO element 3204. Although not illustrated, light can also be coupled into the photonic device 3200 from an external waveguiding structure, such as an optical fibre.

Light from the LOLO element 3204 is coupled into the waveguide element 3206. The waveguide element 3206, may include bends, splitters, ribs and/or ridge structured waveguides. The or each waveguide element 3206 is used to guide incoming light into different regions of the photonic device 3200.

A mode converter 3208 is required to provide efficient coupling of light from the waveguide element 3206 into the photonic element 3202. The photonic element 3202 processes the light, for example it may serve to filter, compensate for dispersion, focus, align or modulate the incoming light.

The operation of photonic element 3202, and where present the other photonic elements 3214,3244, may be altered in a number of ways, including the application of an optical and/or an electrical control signal. The means for altering the operation of the photonic element 3202,3214, 3244 is represented in the Figure as an (optional) controller element 3210. Examples of suitable controller elements 3210 include optical control signal sources, electrical control signal sources, and optical pumps.

The processed light output by the photonic element 3202 is converted into a mode for propagation along the waveguide by the further mode converter 3212. Filtering and possible wavelength separation can then be performed using additional integrated photonic elements 3214.

The light is propagated into a LOLO element 3246 where the light is focussed onto an optical storage medium 3240. The light is collected back again using another LOLO element 3248 where it is processed again with at least one further integrated photonic element 3244. The further integrated photonic element 3244 includes photonic "building block" elements, for example dispersion compensators, focussing elements, filters and amplifiers.

The processed light from further integrated photonic element 3244 is then coupled to at least one waveguide component 3216 (ribs, ridges, splitters and/or bends) and thereby projected onto a detector 3232,3234,3236,3238 which can either be in the plane of the waveguide or external to the waveguide (hence requiring a LOLO element 3218, 3222).

The invention claimed is:

1. An optical waveguide structure comprising:
   a core layer having a first refractive index $n_{core}$,
   a plurality of sub-regions within the core layer, said core layer sub-regions having a second refractive index $n_{rods}$, wherein $n_{rods} - n_{core} > 0.1$, said core layer sub-regions arranged in at least one array, the array of core layer sub-regions extending longitudinally along the waveguide and comprise a photonic band structure within the core layer for propagating an optical mode traveling through said waveguide structure,
   a cladding layer, said cladding layer located adjacent said core layer, said cladding layer having a thrd refractive index, $n_{cladding}$, where $n_{core} > n_{cladding}$, and
   a plurality of sub-regions within the cladding layer, said cladding layer sub-regions contiguous with said core layer sub-regions.

2. An optical waveguide structure according to claim 1, wherein the waveguide structure is a planar waveguide structure, the core layer being formed between said cladding layer and a buffer layer, and the buffer layer having a fourth refractive index, $n_{buffer}$, where $n_{core} > n_{buffer}$.

3. An optical waveguide structure according to claim 1, wherein the waveguide structure is an optical fibre, said cladding layer comprising an annular layer surrounding the core layer.

4. An optical fibre according to claim 3, wherein the cladding layer is planarised in the vicinity of the plurality of cladding layer and core layer sub-regions.

5. An optical waveguide structure according to claim 1, wherein the core layer and cladding layer of sub-regions provides a photonic bandgap.

6. An optical waveguide structure according to claim 1, wherein the core layer sub-regions are formed from silicon.

7. An optical waveguide structure according to claim 1, wherein the core layer is formed from silicon nitride, silicon oxynitride, doped silica, tantalum pentoxide or doped tantalum pentoxide.

8. An optical waveguide structure according to claim 2, wherein the cladding layer is formed from silicon dioxide.

9. A planar optical waveguide structure according to claim 2, wherein the cladding layer sub-regions comprise the same material as the core layer sub-regions.

10. A planar optical waveguide structure according to claim 2, further comprising a plurality of sub-regions in said buffer layer, the buffer layer sub-regions are continuous with said core layer sub-regions.

11. An optical waveguide structure according to claim 1, wherein the cladding layer sub-regions have a refractive index which is greater than or equal to the refractive index of the cladding layer but which is less than or equal to the refractive index of the core layer.

12. An optical waveguide structure according to claim 1, wherein the core layer sub-regions are arranged in a square lattice.

13. An optical waveguide structure according to claim 1, wherein the core layer includes a waveguiding region having no sub-regions.

14. An optical waveguide structure according to claim 13, wherein the waveguiding region includes a bend.

15. An optical device incorporating an optical waveguide structure according to claim 1.

16. A method of manufacturing an optical waveguide structure comprising the steps of:
    providing a core layer having a first refractive index $n_{core}$;
    forming a plurality of holes in the core layer extending longitudinally along the waveguide; and
    filling the holes with a material having a second refractive index $n_{rods}$, wherein:

$n_{rods} - n_{core} > 0.1$ providing a cladding layer, said cladding layer located adjacent said core layer, said cladding layer having a thrd refractive index, $n_{cladding}$, where $n_{core} > n_{cladding}$, and
    providing a plurality of holes within the cladding layer, said cladding layer holes contiguous with said core layer holes.

17. A method according to claim 16, wherein the optical waveguide is a planar waveguide and said core layer has at least two sides, the method further including the steps of:
    providing a buffer layer having a refractive index $n_{buffer}$ on one side of the core layer; and
    the step of providing said cladding layer, provides said cladding layer on the other side of the core layer, wherein:

$n_{rods} > n_{core} > n_{cladding}$ and $n_{buffer}$.

18. A method according to claim 16, wherein the optical waveguide is an optical fibre, the method further including the steps of:
    providing said cladding layer surrounding the core layer, wherein:

$n_{rods} > n_{core} > n_{cladding}$.

19. A method of guiding an optical signal comprising the step of passing an optical signal through a waveguiding region of an optical waveguide structure comprising:
    a core layer having a first refractive index $n_{core}$,
    an array of sub-regions within the core layer extending longitudinally along the waveguide having a second refractive index, $n_{rods}$, the array of sub-regions comprising a photonic band structure within the core layer, wherein:

$n_{rods} - n_{core} > 0.1$ a cladding layer, said cladding layer located adjacent said core layer, said cladding layer having a thrd refractive index, $n_{clapping}$, where $n_{core} > n_{cladding}$, and
    a plurality of sub-regions within the clapping layer, said cladding layer sub-regions contiguous with said core layer sub-regions.

20. A method according to claim 19, wherein the waveguide is a planar waveguide, wherein the core layer is formed between a cladding layer and a buffer layer, and the buffer layer having a fourth refractive index, $n_{buffer}$, and where:

$$n_{core} > n_{buffer}.$$

21. A method according to claim 19, wherein the optical waveguide is an optical fibre, wherein said cladding layer surrounds the core layer, and wherein:

$$n_{rods} > n_{core} > n_{cladding}.$$

22. An optical waveguide structure comprising
a core layer, said core layer having a first refractive index $n_{core}$,
a 2-dimensional array of sub-regions within the core layer, said core layer sub-regions having a second refractive index $n_{rods}$, the array of core layer sub-regions extending longitudinally along the waveguide and comprising a photonic band structure within the core layer, wherein:

$$n_{rods} > n_{core}$$

a cladding layer, said cladding layer located adjacent said core layer, said cladding layer having a thrd refractive index, $n_{cladding}$, where $n_{core} > n_{cladding}$, and
a plurality of sub-regions within the cladding layer, said cladding layer sub-regions contiguous with said core layer sub-regions.

23. An optical waveguide structure according to claim 22, wherein $n_{rods} - n_{core} > 0.1$.

24. An optical waveguide structure according to claim 22, wherein the waveguide structure is a planar waveguide structure, the core layer being formed between said cladding layer and a buffer layer, and the buffer layer having a fourth refractive index $n_{buffer}$, wherein:

$$n_{core} > n_{buffer}.$$

25. An optical waveguide structure according to claim 22, wherein the waveguide structure is an optical fibre, said cladding layer surrounding the core layer.

26. A method of manufacturing a optical waveguide structure comprising the steps of:
providing a core layer having a first refractive index $n_{core}$;
forming a 2-dimensional array of holes in the core layer extending longitudinally along the waveguide structure;
filling the holes with a material having a second refractive index $n_{rods}$, wherein:

$$n_{rods} > n_{core}$$

providing a cladding layer, said cladding layer located adjacent said core layer, said cladding layer having a thrd refractive index, $n_{cladding}$, where $n_{core} > n_{cladding}$, and
providing a plurality of holes within the cladding layer, said cladding layer holes contiguous with said core layer holes.

27. A method according to claim 26, wherein $n_{rods} - n_{core} > 0.1$.

28. A method according to claim 26, wherein the optical waveguide is a planar waveguide and said core layer has at least two sides, the method further including the steps of:
providing a buffer layer having a refractive index $n_{buffer}$ on one side of the core layer; and
the step of providing said cladding layer on the other side of the core layer, wherein:

$$n_{rods} > n_{core} > n_{cladding} \text{ and } n_{buffer}.$$

29. A method according to claim 26, wherein the optical waveguide is an optical fibre, the method further including the steps of:
providing said cladding layer surrounding the core layer, wherein:

$$n_{rods} > n_{core} > n_{cladding}.$$

30. A method of guiding an optical signal comprising the step of passing an optical signal through a waveguiding region of an optical waveguide structure comprising:
a core layer, said core layer having a first refractive index $n_{core}$,
a 2-dimensional array of sub-regions within the core layer extending longitudinally along the waveguide having a second refractive index $n_{rods}$, the array of sub-regions comprising a photonic band structure within the core layer, wherein:

$$n_{rods} > n_{core}$$

a cladding layer, said cladding layer located adjacent said core layer, said cladding layer having a thrd refractive index, $n_{cladding}$, where $n_{core} > n_{cladding}$, and
a plurality of sub-regions within the cladding layer, said cladding layer sub-regions contiguous with said core layer sub-regions.

31. A method according to claim 30, wherein $n_{rods} - n_{core} > 0.1$.

32. A method according to claim 30, wherein the waveguide is a planar waveguide, wherein the core layer is formed between said cladding layer and a buffer layer, and the buffer layer having a fourth refractive index $n_{buffer}$, and wherein:

$$n_{core} > n_{buffer}.$$

33. A method according to claim 30, wherein the optical waveguide is an optical fibre, wherein said cladding layer surrounds the core layer, and wherein:

$$n_{rods} > n_{core} > n_{cladding}.$$

* * * * *